Figures 3, 4, 5:
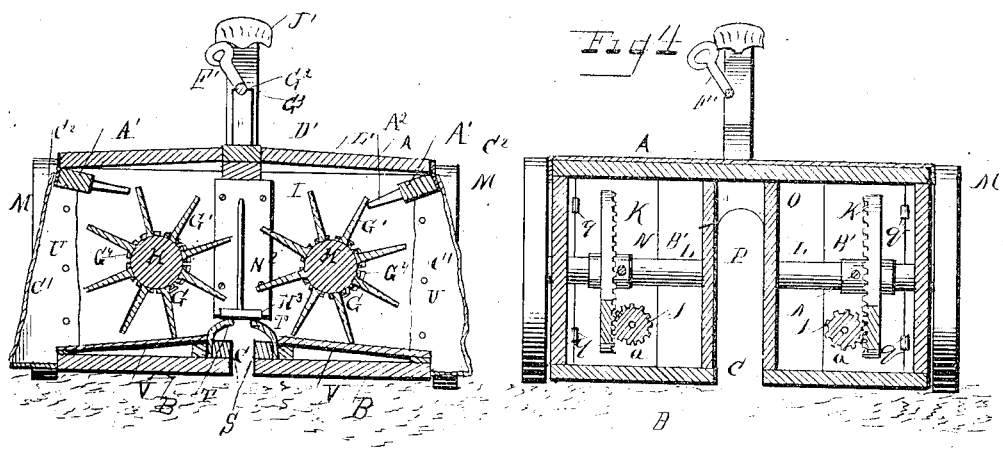

(No Model.) 2 Sheets—Sheet 1.
B. O. SAVAGE.
PEA, BEAN, OR RICE HARVESTER.
No. 371,372. Patented Oct. 11, 1887.
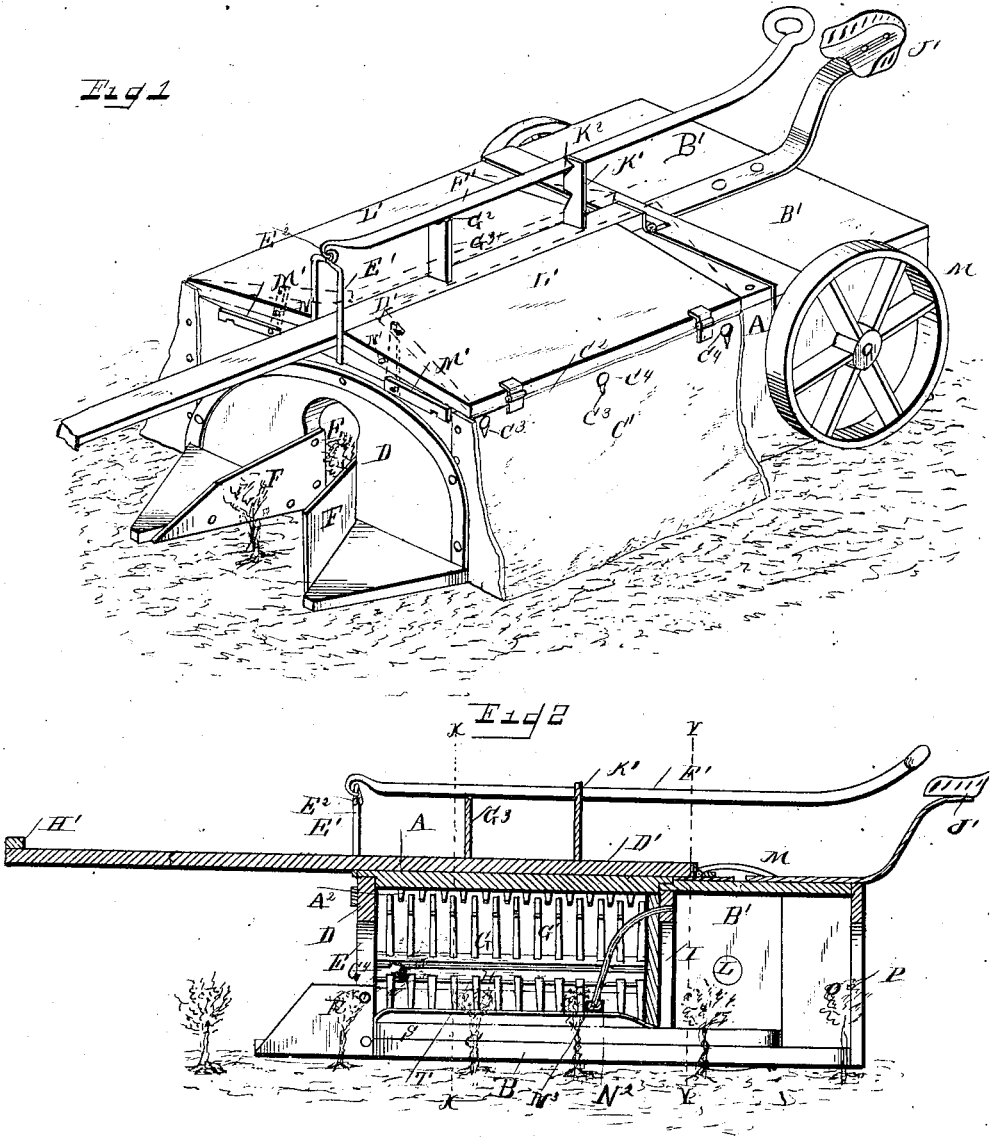
Witnesses
F. L. Ourand
Benj. G. Cowl
Inventor
Benjamin O. Savage,
By his Attorneys
Louis Bagger & Co.

(No Model.) 2 Sheets—Sheet 2.

B. O. SAVAGE.
PEA, BEAN, OR RICE HARVESTER.

No. 371,372. Patented Oct. 11, 1887.

Witnesses
F. L. Durand
Benj. G. Cowl

Inventor
Benjamin O. Savage
By his Attorneys
Louis Bagger & Co.

UNITED STATES PATENT OFFICE.

BENJAMIN O. SAVAGE, OF SCOTLAND NECK, NORTH CAROLINA.

PEA, BEAN, OR RICE HARVESTER.

SPECIFICATION forming part of Letters Patent No. 371,372, dated October 11, 1887.

Application filed April 18, 1887. Serial No. 235,205. (No model.)

*To all whom it may concern:*

Be it known that I, BENJAMIN O. SAVAGE, a citizen of the United States, and a resident of Scotland Neck, in the county of Halifax and State of North Carolina, have invented certain new and useful Improvements in Pea, Bean, or Rice Harvesters; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved pea, bean, and rice harvester. Fig. 2 is a central longitudinal vertical sectional view of the same. Fig. 3 is a transverse vertical sectional view taken on the plane indicated by line $x\,x$, Fig. 2, looking rearward. Fig. 4 is a transverse vertical sectional view taken on the plane indicated by line $y\,y$, Fig. 2; and Fig. 5 is a top plan view with the hinged top covers of the machine thrown back to show the arrangement of the picker-cylinders.

The same letters of reference indicate corresponding parts in all the figures.

My invention consists in an improved harvester for harvesting field-peas, garden-peas, beans, rice, and other garden or field crops, and it will be hereinafter fully described and claimed.

Referring to the several parts by letter, A indicates the outer casing of my improved machine or harvester, in which the pickers are inclosed, and B indicates the rear part of the outer casing, in which the geared cog-wheels are inclosed which serve to rotate the picker-cylinders. The bottom of the casing is divided by the central longitudinal slot or space, C, into the two sides or halves, as shown, this central slot extending for the entire length of the machine.

D indicates the front of the machine-casing, which is formed with the central opening, E, extending up from the bottom a convenient distance, and the forward ends of the bottom pieces are extended in advance of this front end, D, and are inclined outwardly at their inner edges from the opening E. Outwardly-inclined guide boards or pieces F F are secured at their lower edges to the said inclined inner edges of the projecting bottom pieces, and at their rear ends to the ends D at the sides of the opening E, as shown, thereby forming outwardly-extending guides, which pass on each side of the plants and serve to always guide the plants into the opening E between the picker-cylinders.

G G indicate the picker-cylinders, the shafts H of which are journaled at their forward ends in the end piece, D, and at their rear ends in bearings in the transverse vertical partition I, which partition divides the machine into a forward and a rear compartment. The rear ends of the picker cylinder shafts H extend through the transverse partition I into the rear compartments, B' B', and have rigidly mounted upon them the gear-pinions J J, which mesh with gear-wheels K K, which are mounted centrally upon the axles L L, which carry at their outer ends the main or drive wheels M M, which support the rear end of the machine, and which, through the gearing just described, serve to rotate the picker-cylinders as the machine is drawn across the field. The gear-wheels K K are secured to the wheel-axles by means of the set-screws N N, so as to turn therewith when the machine is in operation in the field or garden, and by loosening the said set-screws the wheels K K may be allowed to turn loosely upon the wheel-shafts, or rather the round wheel-shafts will then turn without turning the said gear-wheels, thus stopping the operation of the machinery while the harvester is being drawn from field to field.

The rear end, O, of the machine is formed with the central opening, P, extending from the bottom up a suitable distance. Doors Q Q are secured to the rear end of the machine by hinges $q\,q$, and afford access to the boxes or compartments B' B', in which the gearing is located.

The picker-cylinders are provided with the picker-teeth G', which may be made of iron, steel, or of any suitable hard substance, and of any shape, size, or length, and which may be secured upon the said cylinders in strips G¹, and the strips then secured longitudinally to the rollers, as shown in Figs. 2, 3, and 5, and they may be in any position—that is, either in straight horizontal lines or in inclined or diagonal lines—and may be square in cross-section, or may be knives, if so desired, as is ordinarily done in machines of this class. The picker-cylinder teeth may be of any desired length, but are preferably made of such length that they intermesh—that is, the outer ends of the teeth of one cylinder pass between the outer ends of the teeth of the other cylinder, but do not, of course, come in contact with one another. Upon the inner edges or sides of these bottom pieces, B B, are secured the retaining-strips S S, and upon these strips are secured the flexible strips T T, of leather or other suitable material, which are arranged so as to converge toward their tops, so as to leave a very narrow space between them to prevent waste of the rice or beans, &c., when the harvester is in operation, as will be readily understood.

The sides of the forward part, A, of the casing are formed with the openings U, which extend for nearly the entire length of the picker-cylinders, and these openings may be of any desired height; or a board, V, may be arranged on each side of the machine, as shown in the sectional view, Fig. 3, and serve to catch the peas, &c., before they reach the bottom of the harvester.

To the upper part of the sides of the machine, above the openings U U, are secured the longitudinal side combs or thrasher-bars, A' A', which are provided with the series of teeth, as seen in Fig. 3, or sharp knives $A^2$, as seen in Fig. 5, which are preferably inclined somewhat downward at their inner ends, as shown, and which may be made of any desired size, shape, or length, and of iron, steel, or any suitable hard substance, although they are preferably sharp knives of steel or iron. These teeth or knives $A^2$ are so arranged that the ends of the picker-cylinder teeth intermesh with or pass between them, and they serve to thrash the peas, beans, &c., and also to keep the picker-cylinder teeth clean.

C' C' indicate the receptacles, which are secured to the sides of the machine, as shown, with their bottoms below the lever of the bottom sections, $A^x$, of the machine, and these receptacles have the top flaps, $C^2 C^2$, which may be unbuttoned and thrown back, so as to enable the contents to be readily removed therefrom, the said flaps having openings or eyes $C^3$ in their upper edges buttoning over buttons $C^4$, as shown.

Upon the top of the rear or machine casing is hinged the rear end of the tongue D', which passes through a frame, E', on the front of the machine, and which is connected at its forward end to the neck-yoke. In the ring $E^2$, formed in the top or upper part of the frame E', is hinged the forward end of a lever, F', which I shall call the "adjusting-lever," as it adjusts the height of the forward end of the harvester, and this lever then passes over and rests in the top notch, $G^2$, of a standard or fulcrum, $G^3$, which is secured rigidly upon the tongue at the point shown, the lever extending back to a point where it can be conveniently reached by the driver or operator.

The spring-seat J' has its supporting-spring secured at its lower forward end upon the top of the rear part of the machine-casing, so that the seat extends back of the machine, as shown, and the weight of the driver on this seat serves to counterbalance the weight of the forward part of the harvester to a great extent, as will be readily understood. When the lever F' merely rests in the notched fulcrum G', with its rear end free, as shown in Fig. 1 of the drawings, the weight of the forward part of the harvester brings the top of the frame or yoke E' down into contact with the top of the tongue D', and the bottom of the harvester stands then about in a horizontal plane, as shown in the said figure; but when it is desired to raise the forward end of the harvester it is only necessary to depress the rear free end of the adjusting-lever F', and engage it with one of the side notches, $K^2$, of an upright rack, K', which is secured rigidly upon the tongue to the rear of the fulcrum $G^3$, as shown, the rear end of the said lever being curved upward, as shown, and it will be seen that by this arrangement the forward end of the harvester will be raised as the rear end of the lever is depressed, and will be held in its elevated position by locking the rear end of the said lever into the rack K', as clearly shown in Fig. 2 of the drawings.

The top of the forward part, A, on each side of the tongue, is hinged to form a lid, L'. To the front end, D, are pivoted supports M' M', the notched edges of which may be engaged with studs N' N' on the said lids L' L', so that the lids may be held up to enable the driver to see into the interior of the machine, where the picker-cylinders are located.

Secured to the front end of the partition I is a downwardly-curved rod or bar, $N^2$, to the lower end of which is secured a cross-head, $N^3$. This cross-head is at a short distance from the bottom of the machine and directly over the slot or space O, and as the machine passes over the plants the cross-head comes in contact with them just before they leave the machine and retards or deflects them sufficiently to cause them to be retained a longer time within the machine, whereby they are subjected to a further action of the teeth of the cylinders, thus thrashing some pods which would otherwise have escaped.

From the foregoing description, taken in connection with the accompanying drawings, the construction, operation, and advantages of my improved harvester will be readily understood. It will be seen that it is strong and simple in its construction and exceedingly effective in its operation.

Having thus described my invention, what I claim, and desire to secure by Letters Patent of the United States, is—

1. In a harvester for peas, beans, &c., the combination of a wheel-supported casing the bottom of which is divided longitudinally, thrashing-cylinders journaled longitudinally within the casing, a transverse vertical partition within the casing, a downwardly-curved rod secured to the partition, the lower end of which is at a short distance above the bottom, and a cross-head secured to the lower end of said rod and standing across the longitudinal opening in the bottom.

2. In a harvester for peas, beans, &c., the combination of a wheel-supported casing the bottom of which is divided longitudinally, an outwardly and downwardly inclined board upon each side of the casing above each flat bottom, receptacles upon each side of the casing, two revolving toothed cylinders within the casing, and means, substantially as described, for revolving said cylinders.

In testimony that I claim the foregoing as my own I have hereunto affixed my signature in presence of two witnesses.

BENJAMIN O. SAVAGE.

Witnesses:
G. S. WHITE,
J. Y. SAVAGE.